US006857716B1

(12) United States Patent
Nagahashi

(10) Patent No.: US 6,857,716 B1
(45) Date of Patent: Feb. 22, 2005

(54) PRINT-CONTROLLING METHOD AND PRINT-CONTROLLING DEVICE FOR PRINTER

(75) Inventor: Toshinori Nagahashi, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/677,578

(22) Filed: Oct. 3, 2000

(30) Foreign Application Priority Data

Oct. 4, 1999 (JP) .......................................... 11-283247

(51) Int. Cl.[7] .......................... B41J 29/38; B41J 23/00; B41J 11/44; B41J 3/42; B41J 5/30; B41J 9/44; B41J 5/40; G06F 11/00; G06K 3/00; G06K 7/00
(52) U.S. Cl. .............................. 347/12; 347/37; 347/5; 400/76; 400/70; 400/61
(58) Field of Search ............................... 347/5, 12, 37; 400/76, 70, 61

(56) References Cited

U.S. PATENT DOCUMENTS 5,959,646 A * 9/1999 Bates et al. .................... 347/43
6,336,701 B1 * 1/2002 Hickman ..................... 347/37
2003/0151640 A1 * 8/2003 Marra et al. .................. 347/37

* cited by examiner

Primary Examiner—Stephen D. Meier
Assistant Examiner—Leonard Liang
(74) Attorney, Agent, or Firm—Oliff & Berridge, PLC

(57) ABSTRACT

The invention provides high-speed and high-quality printing when the vertical and horizontal resolutions of print data to be printed differ from the vertical and horizontal resolutions which a printer can process. A table is provided, in which the relationship of position in each printing pass of each of a plurality of pins aligned in the vertical direction of a printing head to a plurality of raster lines in a predetermined range to be printed is examined, whereby the pins aligned in the vertical line to be actuated in each printing pass are determined based on the relationship of a position between each of the pins and each of the raster lines. The table serves as a raster-line/pin-relationship table. A printer driver receives print data from a print-data forming unit, consults the raster-line/pin-relationship table, and actuates the pins for each printing pass according to the raster-line/pin-relationship table.

12 Claims, 14 Drawing Sheets

| RASTER LINE NO. | POSITION (INCH) | FIRST PASS PIN NO. | SECOND PASS PIN NO. |
|---|---|---|---|
| L0 | 0/120 | #0 | |
| L1 | 1/120 | | #0 |
| L2 | 2/120 | | #1 |
| L3 | 3/120 | #2 | |
| L4 | 4/120 | | #2 |
| L5 | 5/120 | #3 | |
| L6 | 6/120 | | #3 |
| L7 | 7/120 | | #4 |

FIG. 2

| RASTER LINE NO. | POSITION (INCH) | FIRST PASS PIN NO. | SECOND PASS PIN NO. |
|---|---|---|---|
| L1 | 1/120 |  | #0 |
| L2 | 2/120 | #1 |  |
| L3 | 3/120 |  | #1 |
| L4 | 4/120 | #2 |  |
| L5 | 5/120 | #3 |  |
| L6 | 6/120 |  | #3 |
| L7 | 7/120 | #4 |  |
| L8 | 8/120 |  | #4 |

FIG. 4

| RASTER LINE NO. | POSITION (INCH) | FIRST PASS PIN NO. | SECOND PASS PIN NO. |
|---|---|---|---|
| L2 | 3/120 | | #0 |
| L3 | 4/120 | #1 | |
| L4 | 5/120 | | #1 |
| L5 | 6/120 | #2 | |
| L6 | 7/120 | | #2 |
| L7 | 8/120 | #3 | |
| L8 | 9/120 | #4 | |
| L9 | 10/120 | | #4 |

FIG. 6

| RASTER LINE NO. | POSITION (INCH) | FIRST PASS PIN NO. | SECOND PASS PIN NO. |
|---|---|---|---|
| L3 | 4/120 | #0 | |
| L4 | 5/120 | #1 | |
| L5 | 6/120 | | #1 |
| L6 | 7/120 | #2 | |
| L7 | 8/120 | | #2 |
| L8 | 8/120 | #3 | |
| L9 | 9/120 | #4 | |
| L10 | 10/120 | | #4 |

FIG. 8

| RASTER LINE NO. | POSITION (INCH) | FIRST PASS PIN NO. | SECOND PASS PIN NO. |
|---|---|---|---|
| L4 | 5/120 | #0 | |
| L5 | 6/120 | | #0 |
| L6 | 7/120 | | #1 |
| L7 | 8/120 | #2 | |
| L8 | 8/120 | | #2 |
| L9 | 9/120 | #3 | |
| L10 | 10/120 | | #3 |
| L11 | 11/120 | | #4 |

FIG. 10

| RASTER LINE NO. | POSITION (INCH) | FIRST PASS PIN NO. | SECOND PASS PIN NO. | THRID PASS PIN NO. |
|---|---|---|---|---|
| L0 | 0/120 | #0 | | |
| L1 | 1/120 | | | #0 |
| L2 | 2/120 | | #1 | |
| L3 | 3/120 | | | #1 |
| L4 | 4/120 | | #2 | |
| L5 | 5/120 | #3 | | |
| L6 | 6/120 | | | #3 |
| L7 | 7/120 | | #4 | |

FIG. 14

PRINT-CONTROLLING METHOD AND PRINT-CONTROLLING DEVICE FOR PRINTER

BACKGROUND OF THE INVENTION

1. Field of Invention

The present invention relates to a print-controlling method for a printer and a print-controlling device for a printer, which have high-speed and high-quality printing properties when the horizontal and/or vertical resolution of the data to be printed is different from that which is performed by the printer.

2. Description of Related Art

A case in a computer system is considered in which a print-data forming unit outputs binary image data and a printer driver receives and processes the data for outputting to a printer (herein, for example, an impact printer) as print data. In this case, the print-data forming unit outputs only a binary image in which the horizontal resolution and the vertical resolution are the same. However, the printer cannot always print print-data having the same horizontal and vertical resolutions. Therefore, generally a printer performs printing only with the resolutions which can be processed by the printer, or else, depending on the system, those data cannot be printed.

Methods for coping with the case in which the resolution of the print-data differs from that which can be processed by the printer are known, in which a resolution conversion is performed, and the resolution of original multiple-value data is converted into that which is processed by the printer by a method called scaling, i.e., by forming required pixels by a method such as interpolation.

However, a problem is found in that these methods generally include complex processes, which increase the load on a CPU and the processing time. Another one of several problems is that large storage regions are required for the processing.

Another problem is that known methods cannot generally be applied, as they are, to a system for processing binary print data; when binary print data are processed, high quality interpolation cannot be obtained in the binary data, whereby a high-quality printed image cannot be obtained.

SUMMARY OF THE INVENTION

Accordingly, the present invention provides high-speed and high-quality printing when the vertical and horizontal resolutions of print data to be printed differ from the vertical and horizontal resolutions which a printer can process, and provides printing with a horizontal resolution by a printer having a horizontal resolution higher than the vertical resolution thereof.

To this end, a method for print-control of a printer may provide, according to the present invention, in which at least the unit of vertical transfer of a printing head is not the reciprocal of an integral vertical resolution of print data, and a pitch of pins of the printing head is not any one of an integral multiple of the vertical resolution and the reciprocal of the integral vertical resolution. The method may include the steps of examining the relationship of a position, in each printing pass, of each of a plurality of the pins provided in the vertical direction of the printing head to a plurality of raster lines to be printed in a predetermined printing range, based on the vertical resolution of the print data, the pitch of the pins of the printing head, the amount of a unit of vertical transfer of the printing head, the position of a print-starting raster line, and the number of passes in the horizontal direction required for printing the predetermined printing range; preparing a raster-line/pin-relationship table in which pins to be actuated for printing the raster lines to be printed are determined in each printing pass based on the relationship between the position of the pins and the raster lines; determining the number of printing passes and the position of the print-starting raster line; consulting one of the raster-line/pin-relationship tables according to the determination; and printing the predetermined printing range by actuating the pins in each printing pass based on the raster-line/pin-relationship table.

In the method, a plurality of the raster-line/pin-relationship tables may be prepared according to the position of the print-starting raster line which is determined based on the print data under conditions of the vertical resolution of the print data, the pitch of the pins of the printing head, and the unit of vertical transfer of the printing head; any one of the plurality of raster-line/pin-relationship tables may be selected according to the position of the print-starting raster line which was determined; and the pins used in each printing pass may be actuated by consulting the selected raster-line/pin-relationship table.

According to the present invention, a print-controlling device for a printer may be provided, in which the unit of vertical transfer of a printing head is not the reciprocal of an integral vertical resolution of print data, and the pitch of pins of the printing head is not any one of an integral multiple of the vertical resolution and the reciprocal of the integral vertical resolution. The print-controlling device may include a raster-line/pin-relationship table describing pins to be actuated in each printing pass for printing raster lines to be printed based on the relationship between the position of the pins and the raster lines, by examining the relationship of the position, in each printing pass, of each of a plurality of the pins provided in the vertical direction of the printing head to a plurality of the raster lines to be printed in a predetermined printing range, based on the vertical resolution of the print data, the pitch of the pins of the printing head, the amount of a unit of vertical transfer of the printing head, the position of a print-starting raster line, and the number of passes in the horizontal direction required for printing the predetermined printing range. The print-controlling device may also include a print data forming unit for forming print data to be printed; a printer driver for determining the position of a print-starting line, for determining the number of printing passes, for consulting the raster-line/pin-relationship table, and for outputting a pin driving signal for each driving pass according to the raster-line/pin-relationship table; a printing head transferring unit for transferring the printing head to a predetermined position, based on the signal from the printer driver; and a data transmitting unit for transmitting print data and information required for printing operation, received from the printer driver.

In the print-controlling device for a printer, a plurality of the raster-line/pin-relationship tables may be prepared based on the variations of the position of the print-starting raster line determined by the print data, under a condition of the vertical resolution of the print data, the pitch of the pins of the printing head, and the unit of vertical transfer of the printing head; the printer driver may select one of the plurality of raster-line/pin-relationship tables based on the position of the print-starting raster line which was determined by the printer driver; and the pins used in each printing pass may be actuated by consulting the selected raster-line/pin-relationship table.

The present invention is applied to a case where the unit of vertical transfer of the printing head is not the reciprocal of the integral vertical resolution of print data, and the pitch of pins of the printing head is not an integral multiple of the vertical resolution or the reciprocal of the integral vertical resolution. For print-controlling such a printer, raster-line/pin-relationship tables are prepared, which are described below. The raster-line/pin-relationship tables, roughly described, are those in which pins aligned in the vertical direction are selected to be actuated for printing raster lines to be printed. When determining the position of a print-starting raster line and the number of printing passes, the pins to be used in each printing pass are actuated according to a raster-line/pin-relationship table selected to be consulted based on the position of the print-starting raster line and the number of printing passes.

With this arrangement, printing is enabled without performing complex processes, such as resolution conversion, and the like, because a printing operation can be performed by determining pins to be actuated by consulting, when printing, the raster-line/pin-relationship tables, in a case where the unit of vertical transfer of the printing head of a printer is not the reciprocal of the integral vertical resolution of print data, or the pitch of pins included in a printing structure of the printing head of the printer is not an integral multiple of the vertical resolution or the reciprocal of the integral vertical resolution. Moreover, high-quality printing faithful to actual print-data is enabled by selecting pins on the same positions as those of the raster lines to be printed or pins nearest to the positions.

High-quality printing is also enabled because a vertical resolution can be equalized with a horizontal resolution when a printer can print data having the horizontal resolution higher than the vertical resolution. For example, when a printer can print data having a horizontal resolution of 120 dpi and a vertical resolution of 72 dpi, the printer can print data having a horizontal resolution of 120 dpi and a vertical resolution of 120 dpi received from a print-data forming unit. The operation requires no complex processes, and it can be performed only by consulting the raster-line/pin-relationship tables.

A plurality of the raster-line/pin-relationship tables may be prepared according to the variation of the print-starting lines under a condition of the vertical resolution of the print data, the pitch of pins of the printing head, and the amount of a unit of vertical transfer of the printing head. By selecting one of the raster-line/pin-relationship tables to be consulted according to the position of the print-starting raster line, pins to be used in each printing pass are actuated. The proper pins can be actuated by simply consulting a raster-line/pin-relationship table according to the print-starting raster line, in which the plurality of raster-line/pin-relationship tables are prepared based on the print-starting lines which vary according to print data.

BRIEF DESCRIPTION OF THE DRAWINGS

FIG. 2 is a raster-line/pin-relationship table prepared based on the relationship between the raster lines to be printed and the position of the printer head pins shown in FIG. 1;

FIG. 4 is a raster-line/pin-relationship table prepared based on the relationship between the raster lines to be printed and the position of the printer head pins shown in FIG. 3;

FIG. 6 is a raster-line/pin-relationship table prepared based on the relationship between the raster lines to be printed and the position of the printer head pins shown in FIG. 5;

FIG. 8 is a raster-line/pin-relationship table prepared based on the relationship between the raster lines to be printed and the position of the printer head pins shown in FIG. 7;

FIG. 10 is a raster-line/pin-relationship table prepared based on the relationship between the raster lines to be printed and the position of the printer head pins shown in FIG. 9;

FIG. 14 is a raster-line/pin-relationship table prepared based on the relationship between the raster lines to be printed and the position of the printer head pins shown

DETAILED DESCRIPTION OF PREFERRED EMBODIMENTS

Figure 1:
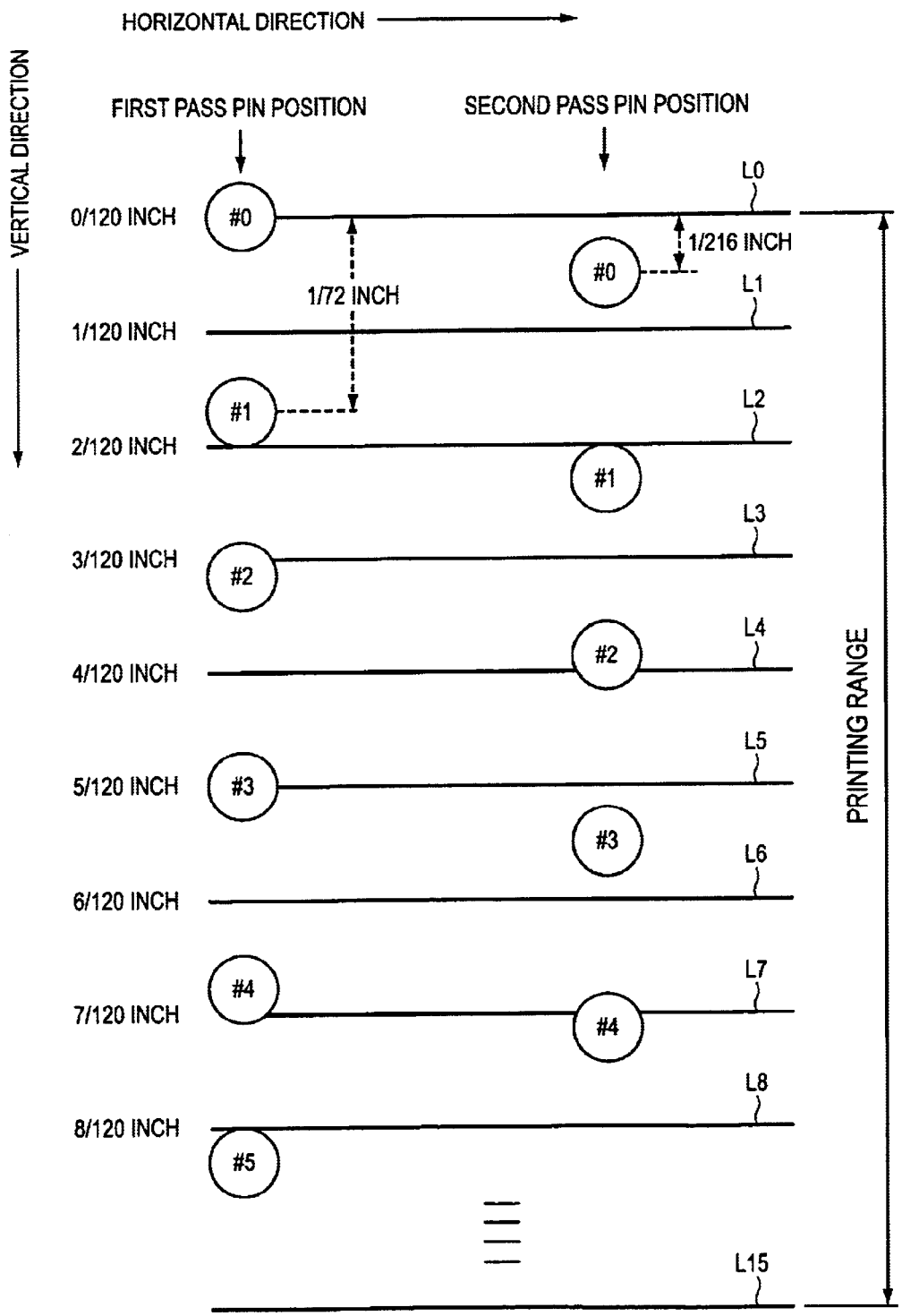
FIG. 1 is a diagram of the relationship between raster lines to be printed and the position of printer head pins when a print-starting line is a raster line L0, under the conditions set for an embodiment according to the present invention.

An embodiment according to the present invention is described below with reference to the drawings.

The present invention is applied to cases under the general conditions described as follows.

(1) The unit of vertical transfer of a printing head of a printer is not the reciprocal of the integral vertical resolution of the print data.

(2) The pitch of pins of a printing structure of the printing head of the printer has no particular relationship with the vertical resolution, such as an integral multiple of the vertical resolution or the reciprocal of the integral vertical resolution.

As for example, in case (1) above, when the vertical resolution of the print data is 120 dpi (a dot pitch of $\frac{1}{120}$ inch), and the unit of vertical transfer of the printer head is $\frac{1}{240}$ inch, wherein the unit of vertical transfer of the printer head is the reciprocal of the integral vertical resolution of the print data, a desired resolution can be easily obtained by performing simple transfer control on the printing head. Therefore, the process according to the present invention is not required in the case in which the unit of vertical transfer of the printer head is the reciprocal of the integral vertical resolution of the print data.

As, for example, in the case of (2) above, when the vertical resolution of the print data is 120 dpi (a dot pitch of $\frac{1}{120}$ inch), and the dot pitch of the printer head is $\frac{1}{60}$ inch, wherein the dot pitch of the printing structure of the printer head is an integral multiple of the vertical resolution or the reciprocal of the integral vertical resolution, a desired resolution can be easily obtained by performing simple transfer control on the printing head. Therefore, the process according to the present invention is not required in this case.

The present invention is applied to the cases described in the above (1) and (2), and enables high-speed and high-quality printing by simple print-controlling processes. In order to achieve the aim, the processes are performed as follows.

The following conditions are set for the embodiment of the present invention so that the description is easy to understand.

(a) The printer can process the horizontal resolution of print data outputted by a print-data forming unit, and it cannot process the vertical resolution thereof.

(b) The number of raster lines which the printer can print in one operation is at most eight, that is, it can print with at most eight pins.

(c) The pitch between each pin of the print head (the pitch between each pin aligned at least in the vertical direction) is $\frac{1}{72}$ inch.

(d) The minimum unit of vertical transfer of the print head is $\frac{1}{216}$ inch.

(e) Eight raster lines are printed in two passes. When a print head horizontally moves once from left to right or from right to left for printing a line in the horizontal direction, the operation is called one pass. Then the printer head moves by a desired distance (in this case, $\frac{1}{216}$ inch) in the vertical direction for a horizontal movement from left to right or from right to left in the second pass.

According to the present embodiment, the printer receives data having a horizontal resolution of 120 dpi and a vertical resolution of 120 dpi from the print data forming unit instead of the data having a horizontal resolution of 120 dpi and a vertical resolution of 72 dpi (hereinafter referred to as 120 dpi×72 dpi), although the printer can print data of 120 dpi×72 dpi. An embodiment is described below in which print data of 120 dpi×120 dpi can be printed without a complex resolution conversion process.

In this case, according to the invention, the conditions are set as (c) and (d) described above, in which the pin pitch of the printer head is $\frac{1}{72}$ inch, and the minimum unit of vertical transfer of the head is $\frac{1}{216}$ inch, while the print data from the print-data forming unit have resolutions of 120 dpi×120 dpi, whereby the conditions described in the above (1) and (2) are satisfied.

A case not satisfying the conditions, that is, a case to which the present invention is not necessarily applied, is that in which the resolutions which a printer can process are, for example, 144 dpi×72 dpi, while the print data from the print-data forming unit have resolutions of 144 dpi×144 dpi and the unit of vertical transfer of the printer head is, for example, $\frac{1}{72}$ inch. In this case, after printing at 144 dpi×72 dpi, the printer head is vertically transferred by $\frac{1}{72}$ inch for another printing process, thereby enabling printing at 144 dpi×144 dpi. Therefore, the invention is not applied to this case. The embodiment according to the invention is described as follows.

FIG. 1 shows a plurality of raster lines with a pitch of $\frac{1}{120}$ inch, and positions of the pins of a printer head aligned in the vertical direction associated with each raster line, the positions of the pins in a first pass and a second pass being shown. The raster lines are conveniently represented by L0, L1, L2, . . . in the vertical direction, the zeroth raster line being the base line. The pins of the printer head are represented by pin #0, pin #1, pin #2, . . . (eight pins are provided in a line along the vertical direction). The positions of the raster lines with respect to the raster line L0 are represented by $\frac{1}{120}$ inch, $\frac{2}{120}$ inch, etc.

In the embodiment, the raster lines are printed in units of eight, i.e., eight raster lines are printed in two passes, as described above.

The relationship between the positions of pin #0, pin #1, pin #2, . . . of the printer head and the positions of each raster line varies depending on which is the print-starting raster line. The print-starting line changes according to the print data. When a print-starting line is determined, the printer head is moved, in which the printer head is vertically transferred to the print-starting line, or to the vicinity thereof, in units of $\frac{1}{216}$ inch, as the minimum transfer unit of the printer head is, in this case, $\frac{1}{216}$ inch.

Since the raster lines L0, L1, . . . are disposed at a pitch of $\frac{1}{120}$ inch, when the pin #0 is placed on the raster line L0, which is the print-starting raster line, apart from the pin #0, the pin #3 and the pin #6 are placed on other raster lines (the pin #3 is on the raster line L5 and the pin #6 is on the raster line L10), and the other pins are not on raster lines.

The pin #3 is at $\frac{3}{72}$ inch from the pin #0, which is the same position as that of the raster line L5 with respect to the raster line L0 ($\frac{5}{120}$ inch), which satisfies $(\frac{3}{72})=(\frac{5}{120})$. In the same manner, the pin #6 is at $\frac{6}{72}$ inch from the pin #0, which is the same position as that of the raster line L10 with respect to the raster line L0 ($\frac{10}{120}$ inch), which satisfies $(\frac{6}{72})=(\frac{10}{120})$.

When a print-starting raster line is thus determined, the printer head is moved by the minimum unit of transfer to be positioned nearest to the print-starting raster line. When the pin #0 of the printer head is positioned on the raster line L5, the pin #3 and the pin #6 are also on raster lines (the pin #3 on the raster line L10 and the pin #6 on the raster line L15), in which the printer head has been moved nine times the unit of $\frac{1}{216}$ inch. In this order, the pin #0 is positioned on a raster line by the transfer by a unit of $\frac{9}{216}$ inch (=$\frac{3}{72}$ inch). According to the present embodiment, the relationship between the raster lines and the pins is the same as that described above, when a raster line with any reference numeral increased by five or a multiple of five serves as a print-starting line.

According to the embodiment, a table is provided showing the relationship between the raster lines and the pins in consideration of the above, which is described below.

When a print-starting line happens to be the raster line L0, the printer head is moved so that the pin #0 is positioned at a pin position in a first pass shown in FIG. 1. The relationship of position, in the first pass, between the printer head pins #0, #1, #2, ... and the raster lines L0, L1, L2, . . . , in this case, is shown in FIG. 1.

When the printer head is moved so that the pin #0 is positioned at the position in a second pass in FIG. 1, the relationship of position, in the second pass, between the printer head pins #0, #1, #2, . . . and the raster lines L0, L1, L2, . . . is shown in FIG. 1. In the second pass, the printer head is vertically moved by $\frac{1}{216}$ inch from the position in the first pass. The pins #0, #1, #2, . . . in the second pass are disposed, deviated in the vertical direction by $\frac{1}{216}$ inch from the pins #0, #1, #2, . . . in the first pass, respectively.

In the embodiment, eight raster lines (the raster lines L0 to L7) are printed in two passes. To this end, pins to be actuated in the first pass and pins to be actuated in the second pass are selected. In this case, the pins nearest to the raster lines to be printed are selected to be actuated, although, from an ideal point of view, pins just on the raster lines to be printed are actuated, which is not the case.

In consideration of the above, it is found in FIG. 1 that the pins #0, #2, and #3 in the first pass, and the pins #0, #1, #2, #3-pin, and #4-pin in the second pass are most preferably actuated.

In this operation, the raster lines L0, L3, and L5 are printed in the first pass, and the remaining raster lines L1, L2, L4, L6, and L7 are printed in the second pass.

Thus, it is found that when a first raster line (a print-starting raster line) is the raster line L0, the pins #0, #2, and #3 are actuated for printing in the first pass, and the pins #0, #1, #2, #3, and #4 are actuated for printing in the second pass under the condition set for the present embodiment, in which the print data has a vertical resolution of 120 dpi, pins of the printer head are disposed at a pitch of $\frac{1}{72}$ inch, and the printer head is vertically transferred in units of $\frac{1}{216}$ inch. FIG. 2 shows the relationship between raster line positions (reference numerals of the raster lines) and reference numerals of the pins to be actuated in the first pass and the second pass.

A table (herein referred to as a raster-line/pin-relationship table) is provided as shown in FIG. 2, in which the relationship between the raster lines to be printed and the pins with reference numerals to be actuated is shown. By referring to the raster-line/pin-relationship table, the pins to be actuated can be selected when the print-starting raster line happens to be the raster line L0.

The raster-line/pin-relationship table is not only used when the print-starting line is the raster line L0, but it can also be used when the print-starting raster line is any raster line which has a reference numeral of L0 increased by five or a multiple of five, such as the raster line L5 or L10; this is because the relationship between the raster lines and the pins is repeated in the same manner when the print-starting raster line is a raster line with a reference numeral increased by five or a multiple of five, as described above.

When the print-starting raster line is a raster line to which the pin #0 is applied by the printer head moving by the transfer unit (in this embodiment, the raster line L0, L5, L10, or another), the raster-line/pin-relationship table shown in FIG. 2 can be used.

The print-starting raster line is not always a raster line to which the pin #0 is applied when the printer head is moved by the transfer unit. In FIG. 1, the print-starting raster line cannot be determined to be a certain raster line of the raster lines L0, L1, L2, L3 . . . . , and it may be any one of these raster lines.

However, when the print-starting raster line is the raster line L5 or L10, the raster-line/pin-relationship table shown in FIG. 2 can be used. Therefore, cases in which the print-starting tine is one of the five raster lines L0, L1, L2, L3, and L4 are considered. The other cases are considered in the same way as that in the case where the print-starting line is one of the raster lines L0, L1, L2, L3, and L4, which is repeated in the same way in the other cases.

Apart from that shown in FIG. 2, the raster-line/pin-relationship table is prepared in patterns shown in FIG. 4, FIG. 6, FIG. 8, and FIG. 10, which are described below.

Figure 3:
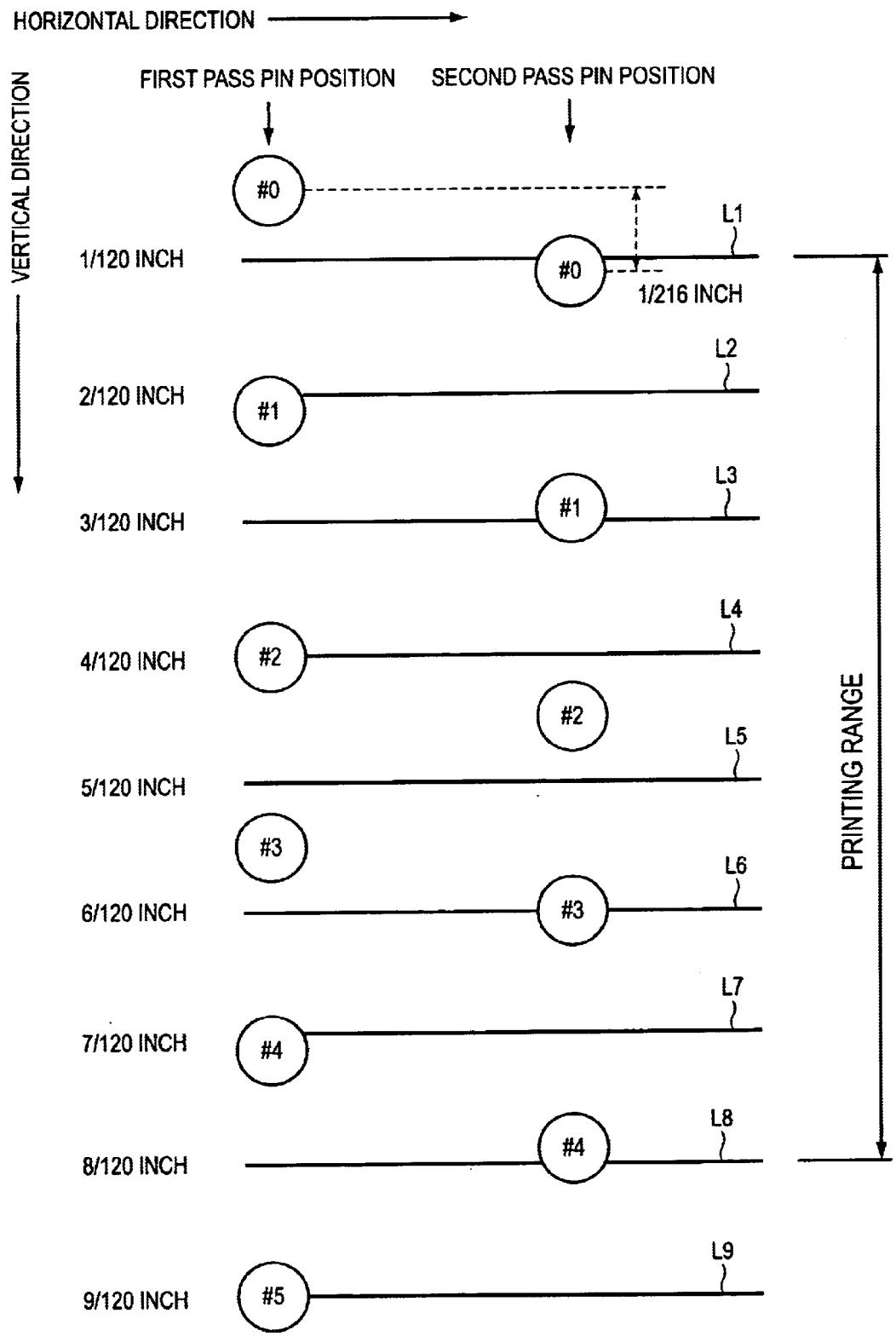
FIG. 3 is a diagram of the relationship between raster lines to be printed and the position of printer head pins when a print-starting line is a raster line L1, under the conditions set for the embodiment according to the present invention.

The raster-line/pin-relationship table shown in FIG. 4 is used when the print-starting raster line is the raster line L1. The position of pins when the printer head starts to print is shown in FIG. 3, in which the print-starting raster line is the raster line L1. The printer head is vertically transferred in a first pass by $\frac{1}{216}$ inch from the position shown in FIG. 1.

A case in which the printing starts with the printer head positioned at the above-described position is considered. In this case, as in the case described above, eight raster lines (the raster lines L1 to L8) are printed in two passes. Pins to be actuated in a first pass and pins to be actuated in a second pass are selected. The pins nearest to the raster lines to be printed (the raster lines L1 to L8 in this case) are selected to be actuated, although, from an ideal point of view, pins just on the raster lines to be printed are actuated, which is not the case.

Considering the above, it is found in FIG. 3 that the pins #1, #2, #3, and #4 in the first pass, and the pins #0, #1, #3, and #4 in the second pass are preferably selected to be actuated.

In this operation, the raster lines L2, L4, L5, and L7 are printed in the first pass, and the remaining raster lines L1, L3, L6, and L8 are printed in the second pass.

Thus, it is found that when the print-starting raster line is the raster line L1, the pins #1, #2, #3, and #4 are actuated for printing in the first pass, and the pins #0, #1, #3, and #4 are actuated for printing in the second pass under the conditions set for the present embodiment, in which the print data has a vertical resolution of 120 dpi, pins of the printer head are disposed at a pitch of $\frac{1}{72}$ inch, and the printer head is vertically transferred in units of $\frac{1}{216}$ inch. FIG. 4 shows the relationship between raster line positions (reference numerals of the raster lines) and reference numerals of the pins to be actuated in the first pass and the second pass.

A raster-line/pin-relationship table is provided as shown in FIG. 4, in which the relationship between the raster lines to be printed and the pins with reference numerals to be actuated is shown. By referring to the raster-line/pin-relationship table shown in FIG. 4, the pins to be actuated can be selected when the print-starting raster line happens to be the raster line L1.

The raster-line/pin-relationship table shown in FIG. 4 is not only used when the print-starting line is the raster line L1, but it can also be used when the print-starting raster line is any raster line which has a reference numeral of L1 increased by five or a multiple of five, such as the raster line L6 or L11. This is because the relationship between the raster lines and the pins is repeated in the same manner when the print-starting raster line is a raster line with a reference numeral increased by five or a multiple of five, as described above.

FIG. 6 shows a raster-line/pin-relationship table which is used when the print-starting raster line is the raster line L2. When the print-starting line is the raster line L2, the printer head is positioned in a state shown in FIG. 5, when the printing starts, in which the printer head, in a first pass, is vertically transferred by $\frac{3}{216}$ inch ($=\frac{1}{72}$) from the position shown in FIG. 1.

A case in which the printing starts with the printer head at the above-described position is considered. In this case, as in the case described above, eight raster lines (the raster lines L2 to L9) are printed in two passes. Pins to be actuated in a first pass and pins to be actuated in a second pass are selected. The pins nearest to the raster lines to be printed are selected to be actuated, although, from an ideal point of view, pins just on the raster lines to be printed are actuated, which is not the case.

Figure 5:
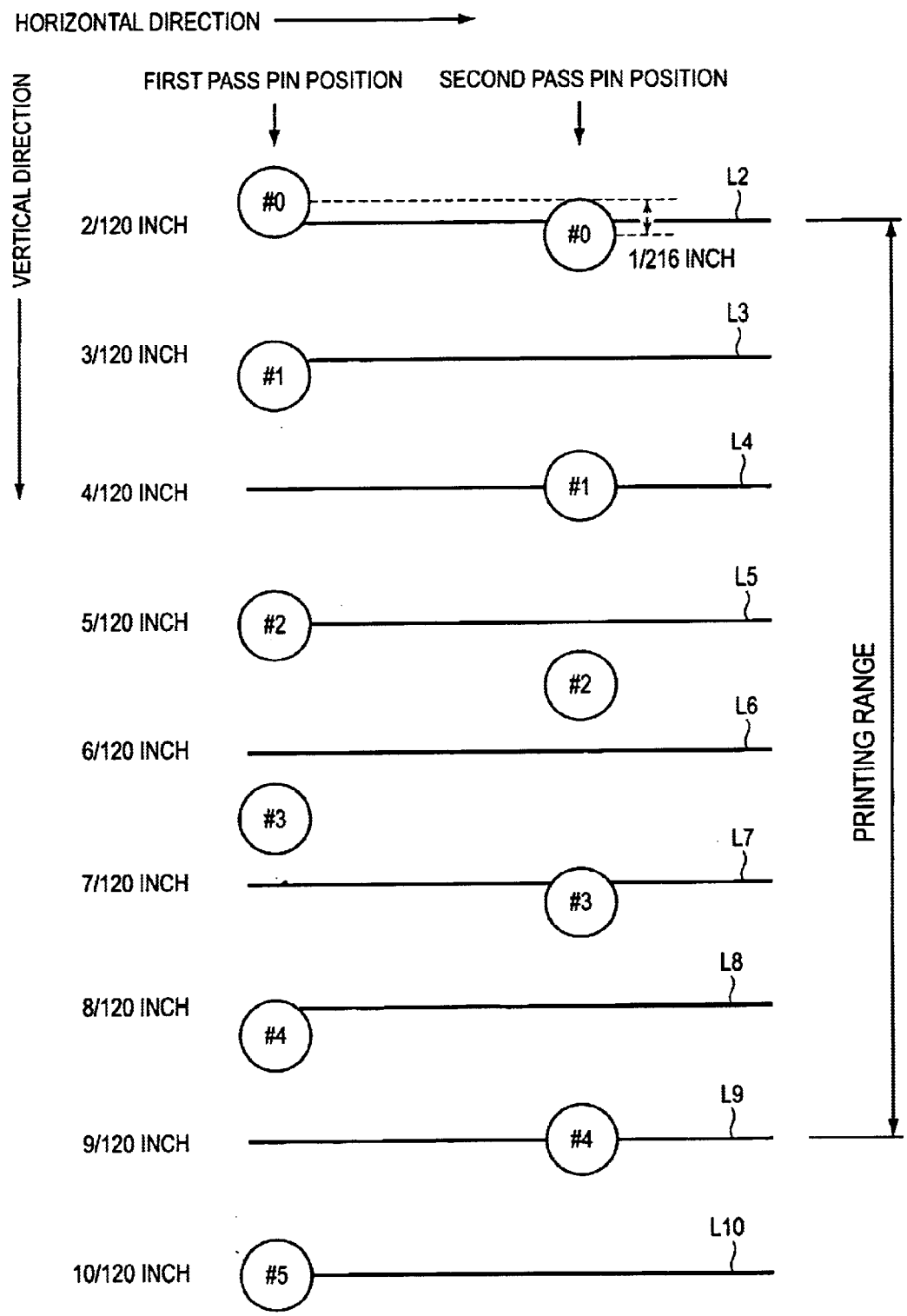
FIG. 5 is a diagram of the relationship between raster lines to be printed and the position of printer head pins when a print-starting line is a raster line L2, under the conditions set for the embodiment according to the present invention.

Considering the above, it is found in FIG. 5 that the pins #1, #2, #3, and #4 in the first pass, and the pins #0, #1, #2, and #4 in the first pass are preferably selected to be actuated.

In this operation, the raster lines L3, L5, L7, and L8 are printed in the first pass, and the remaining raster lines L2, L4, L6, and L9 are printed in the second pass.

Thus, it is found that when the print-starting raster line is the raster line L2, the pins #1, #2, #3, and #4 are actuated for printing in the first pass, and the pins #0, #1, #2, and #4 are actuated for printing in the second pass under the conditions set for the present embodiment, in which the print data has a vertical resolution of 120 dpi, pins of the printer head are disposed at a pitch of $1/72$ inch, and the printer head is vertically transferred in units of $1/216$ inch. FIG. 6 shows the relationship between raster line positions (reference numerals of the raster lines) and reference numerals of the pins to be actuated in the first pass and the second pass. The raster-line/pin-relationship table is provided as shown in FIG. 6, in which the relationship between the raster lines to be printed and the pins with reference numerals to be actuated is shown. By referring to the raster-line/pin-relationship table shown in FIG. 6, the pins to be actuated can be selected, when the print-starting raster line happens to be the raster line L2.

The raster-line/pin-relationship table shown in FIG. 6 is not only used when the print-starting line is the raster line L2, but it can also be used when the print-starting raster line is any raster line which has a reference numeral of L2 increased by five or a multiple of five, such as the raster line L7 or L12. This is because the relationship between the raster lines and the pins is repeated in the same manner when the print-starting raster line is a raster line with a reference numeral increased by five or a multiple of five, as described above.

FIG. 8 shows a raster-line/pin-relationship table which is used when the print-starting raster line is the raster line L3. When the print-starting line is the raster line L3, the printer head is positioned in a state shown in FIG. 7 when the printing starts, in which the printer head, in a first pass, is vertically transferred by $5/216$ inch from the position shown in FIG. 1.

A case in which the printing starts with the printer head at the above-described position is considered. In this case, as in the case described above, eight raster lines (the raster lines L3 to L10) are printed in two passes. Pins to be actuated in a first pass and pins to be actuated in a second pass are selected. The pins nearest to the raster lines to be printed are selected to be actuated, although, from an ideal point of view, pins just on the raster lines to be printed are actuated, which is not the case.

Figure 7:
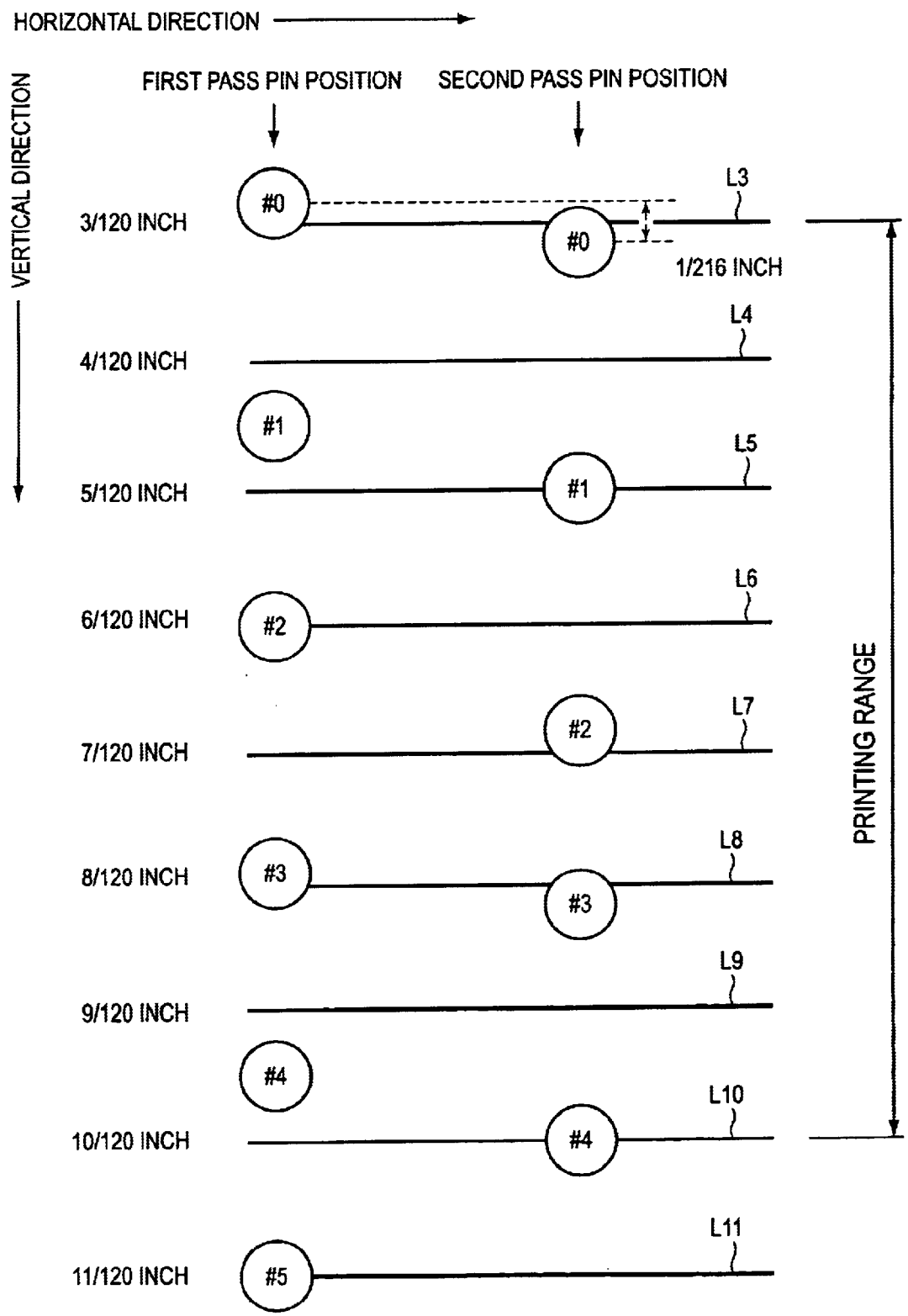
FIG. 7 is a diagram of the relationship between raster lines to be printed and the position of printer head pins when a print-starting line is a raster line L3, under the conditions set for the embodiment according to the present invention.

Considering the above, it is found in FIG. 7 that the pins #0, #1, #2, #3, and #4 in the first pass, and the pins #1, #2, and #4 in the second pass are preferably selected to be actuated.

In this operation, the raster lines L3, L4, L6, L8, and L9 are printed in the first pass, and the remaining raster lines L5, L7, and L10 are printed in the second pass.

Thus, it is found that when the print-starting raster line is the raster line L3, the pins #0, #1, #2, #3, and #4 are actuated for printing in the first pass, and the pins #1, #2, and #4 are actuated for printing in the second pass under the conditions set for the present embodiment, in which the print data has a vertical resolution of 120 dpi, pins of the printer head are disposed at a pitch of $1/72$ inch, and the printer head is vertically transferred in units of $1/216$ inch. FIG. 8 shows the relationship between raster line positions (reference numerals of the raster lines) and reference numerals of the pins to be actuated in the first pass and the second pass. A raster-line/pin-relationship table is provided as shown in FIG. 8, in which the relationship between the raster lines to be printed and the pins with reference numerals to be actuated is shown. By referring to the raster-line/pin-relationship table shown in FIG. 8, the pins to be actuated can be selected when the print-starting raster line happens to be the raster line L3.

The raster-line/pin-relationship table shown in FIG. 8 is not only used when the print-starting line is the raster line L3, but it can also be used when the print-starting raster line is any raster line which has a reference numeral of L3 increased by five or a multiple of five, such as the raster line L8 or L13. This is because the relationship between the raster lines and the pins is repeated in the same manner when the print-starting raster line is a raster line with a reference numeral increased by five or a multiple of five, as described above.

FIG. 10 shows a raster-line/pin-relationship table which is used when the print-starting raster line is the raster line L4. When the print-starting line is the raster line L4, the printer head is positioned in a state shown in FIG. 9 when the printing starts, in which the printer head, in a first pass, is vertically transferred by $7/216$ inch from the position shown in FIG. 1.

A case in which the printing starts with the printer head at the above-described position is considered. In this case, as in the case described above, eight raster lines (the raster lines L4 to L11) are printed in two passes. Pins to be actuated in a first pass and pins to be actuated in a second pass are selected. The pins nearest to the raster lines to be printed are selected to be actuated, although, from an ideal point of view, pins just on the raster lines to be printed are actuated, which is not the case.

Figure 9:
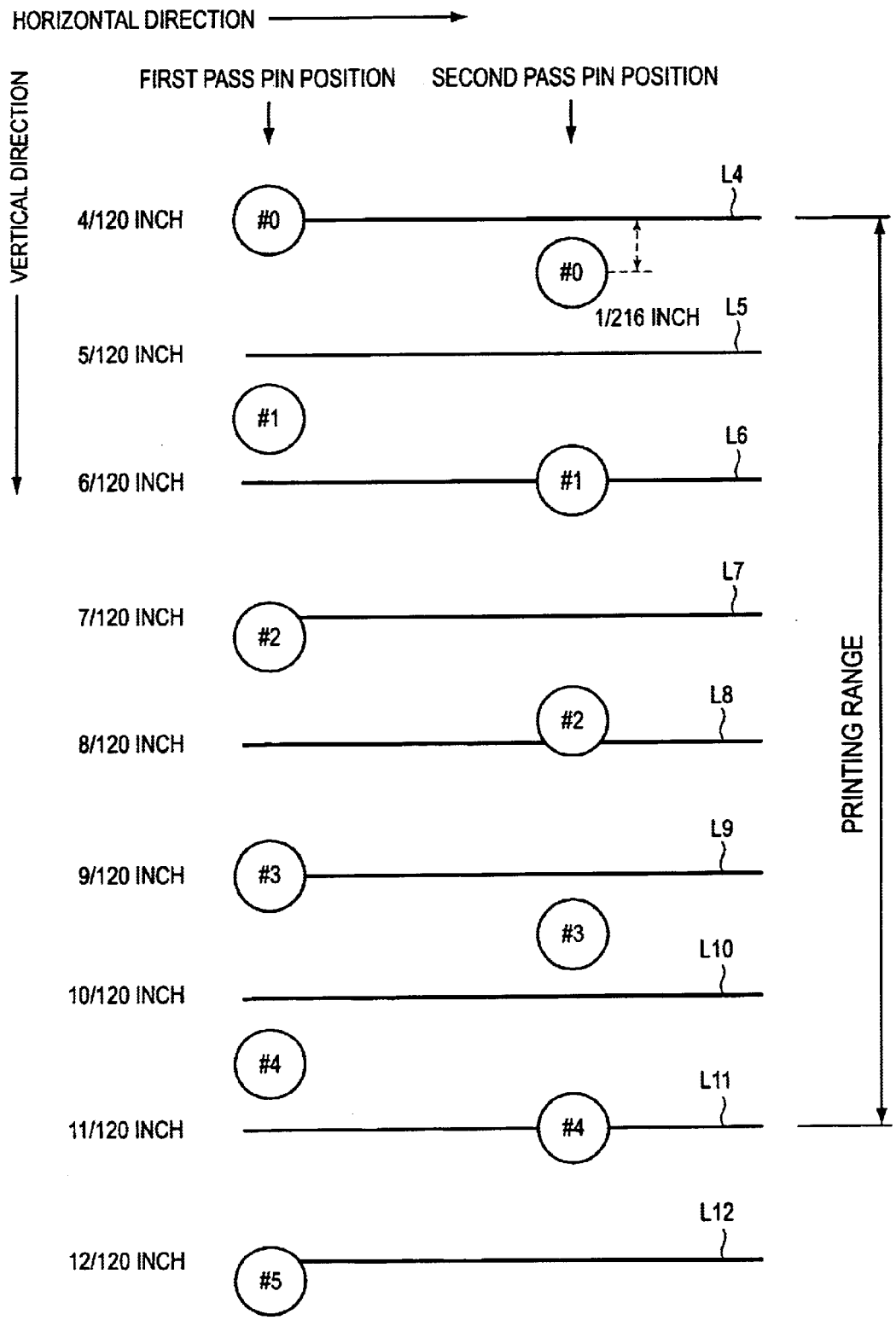
FIG. 9 is a diagram of the relationship between raster lines to be printed and the position of printer head pins when a print-starting line is a raster line L4, under the conditions set for the embodiment according to the present invention.

Considering the above, it is found in FIG. 9 that the pins #0, #2, and #3 in the first pass, and the pins #0, #1, #2, #3, and #4 are preferably selected to be actuated.

In this operation, the raster lines L4, L7, and L9 are printed in the first pass, and the remaining raster lines L5, L6, L8, L10, and L11 are printed in the second pass.

Thus, it is found that when the print-starting raster line is the raster line L4, the pins #0, #2, and #3 are actuated for printing in the first pass, and the pins #0, #1, #2, #3, and #4 are actuated for printing in the second pass under the conditions set for the present embodiment, in which the print data has a vertical resolution of 120 dpi, pins of the printer head are disposed at a pitch of $1/72$ inch, and the printer head is vertically transferred in units of $1/216$ inch. FIG. 10 shows the relationship between raster line positions (reference numerals of the raster lines) and reference numerals of the pins to be actuated in the first pass and the second pass. A raster-line/pin-relationship table is provided as shown in FIG. 10, in which the relationship between the raster lines to be printed and the pins with reference numerals to be actuated is shown. By referring to the raster-line/pin-relationship table shown in FIG. 10, the pins to be actuated can be selected, when the print-starting raster line happens to be the raster line L4.

The raster-line/pin-relationship table shown in FIG. 10 is not only used when the print-starting line is the raster line L4, but it can also be used when the print-starting raster line is any raster line which has a reference numeral of L4 increased by five or a multiple of five, such as the raster line L9 or L14. This is because the relationship between the raster lines and the pins is repeated in the same manner when the print-starting raster line is a raster line with a reference numeral increased by five or a multiple of five, as described above.

Figure 11:
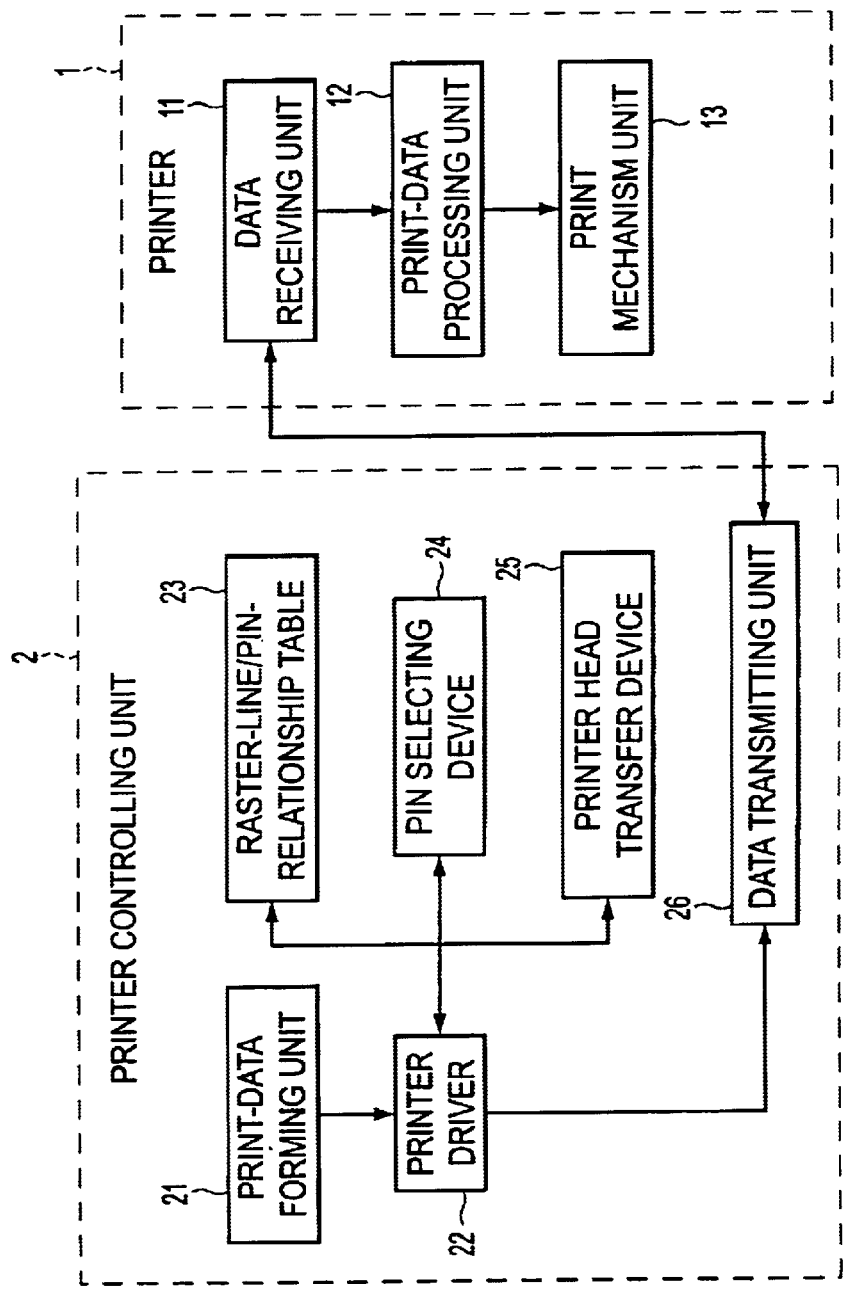
FIG. 11 is schematic block diagram of a configuration of a print-controlling device for a printer according to the present invention.

Printing by using the raster-line/pin-relationship tables described above gave satisfactory results in which no significant distortions were found. There were some cases in which printed lines slightly differed from the raster lines to be printed. However, a satisfactory printing result can be obtained on the whole, FIG. 11 is a block diagram of a print-controlling device for a printer, according to the present invention, in which the raster-line/pin-relationship tables described above are included. The print-controlling device for a printer includes main components, such as a printer 1 for printing and a printer-controlling unit 2 for controlling the printer 1. The printer 1 is a common impact printer. The printer-controlling unit 2 may be a controller used in a computer, and it may be a controller which independently functions as a printer-controlling device.

The printer 1 is provided with a data receiving unit 11, a print-data processing unit 12, a print mechanism unit 13, etc. The print mechanism unit 13 includes the above-described printer head, etc. The print-data processing unit 12 drives the print mechanism unit 13 according to print data from the printer controlling unit 2, whereby the print mechanism unit 13 controls driving of pins of the printer head for printing.

The printer controlling unit 2 is provided with a print-data forming unit 21, a printer driver 22, raster-line/pin-relationship tables 23, a pin selector 24, a printer head transferring unit 25, a data transmitting unit 26, and the like.

Figure 12:
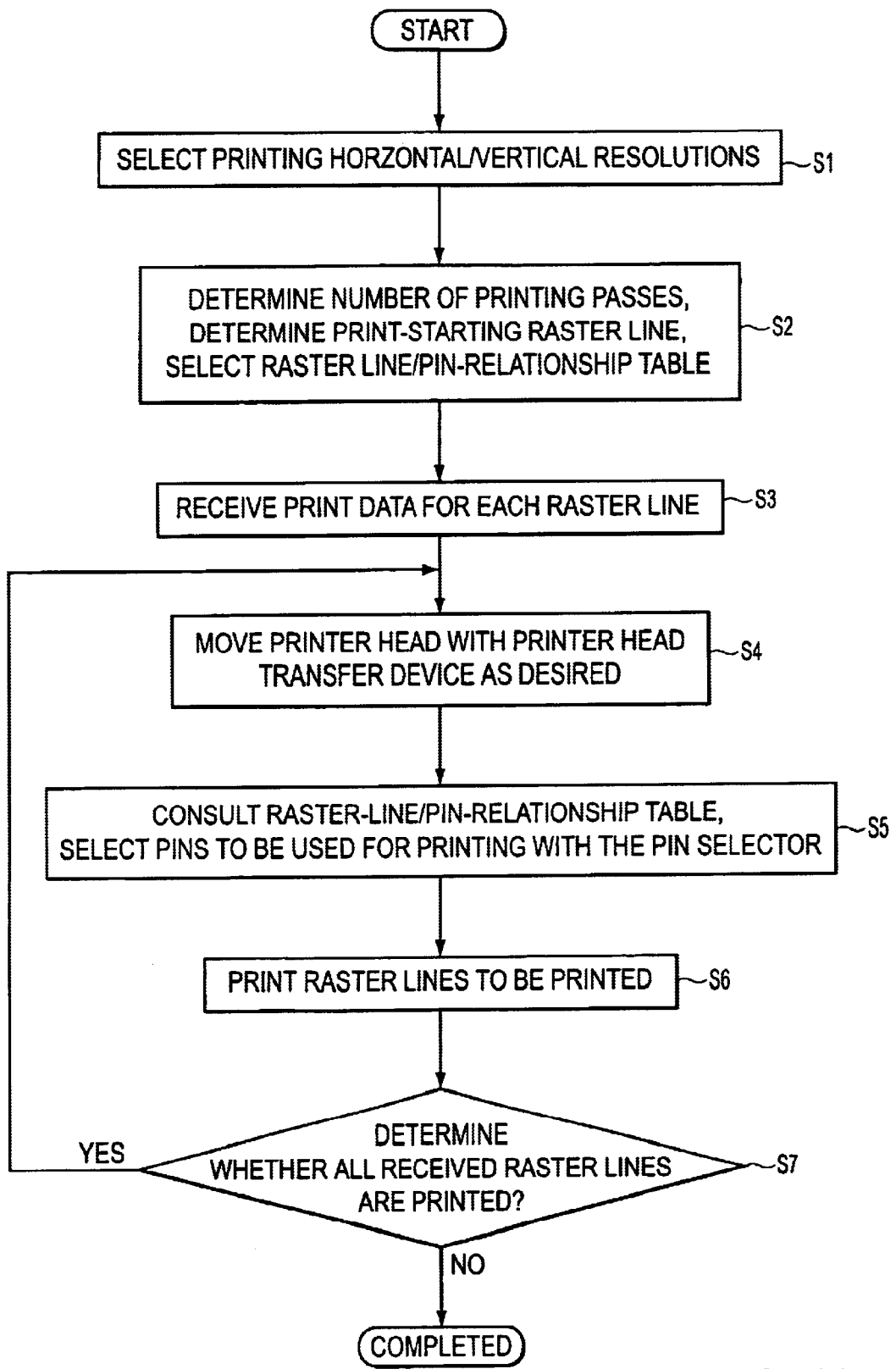
FIG. 12 is a schematic flowchart showing steps of a process for print-controlling a printer.

Operation of the arrangement has been described above, of which processes are generally shown in a flowchart in FIG. 12. The printer driver 22 selects a horizontal resolution and a vertical resolution to be printed in print data from the print data forming unit 21 (step s1). According to the embodiment, the printer prints a horizontal resolution of 120 dpi and a vertical resolution of 72 dpi (120 dpi×72 dpi), and the print-data forming unit 21 outputs print data having 120 dpi×120 dpi.

The number of print passes is determined (in the embodiment, two passes), the position of the print-starting raster line is determined, and the raster-line/pin-relationship table to be applied is determined according to the position of the print-starting raster line (step s2). When the print-starting raster line is, for example, the raster line L0, the raster-line/pin-relationship table shown in FIG. 2 is selected. Print data on each raster line is received from the print-data forming unit 21 (step s3). The printer head transferring unit 25 are controlled to transfer the printer head as desired (step s4). The pin selector 24 select pins to be used for printing, by referring to the selected raster-line/pin-relationship table (step s5).

The print data formed through steps s1 to s5 are outputted by the data transmitting unit 26 to the printer 1. In the printer 1, the data receiving unit 11 receives print data which is analyzed by the print data processing unit 12, and the print mechanism unit 13 is actuated for printing the raster lines (step s6). It is determined whether all the raster lines are printed (step s7). When all the raster lines are printed, the process is completed. When all the raster lines are not printed, the process proceeds to step s4.

As described above, according to the present embodiment, the printing operation is performed when the unit of transfer of a printer head in the vertical direction ($1/216$ inch) is not the reciprocal of the integral vertical resolution of print data (120 dpi, and a gap between raster lines of $1/120$ inch), and when the pitch of pins of the printer head ($1/72$ inch) has no particular relationship with the vertical resolution (120 dpi, and a gap between raster lines of $1/120$ inch), such as an integral multiple of the vertical resolution or the reciprocal of the integral vertical resolution. The printing is enabled by providing several types of raster-line/pin-relationship tables according to the print-starting raster lines, in which the relationship between the raster lines to be printed and the pins to be actuated is described for a given resolution of the print data, whereby one raster-line/pin-relationship table from the several types of raster-line/pin-relationship tables is selected for printing according to the print-starting raster line. The pins to be actuated are determined by the selected raster-line/pin-relationship table.

Accordingly, high-speed printing is enabled by simple processing, when the resolution of print data differs from that which can be printed by the printer. High-quality printing is also enabled because printing can be performed on raster lines extremely close to print data. When the print-data forming unit outputs print data having resolution of 120 dpi×120 dpi while the printer can print, for example, 120 dpi×72 dpi, the print data having 120 dpi×120 dpi can be printed without performing complex processes such as resolution conversion. That is, high-quality printing is enabled by a printer which can print data having a horizontal resolution higher than the vertical resolution, the printing being enabled by equalizing the vertical resolution with the horizontal resolution.

The present invention is not limited to the embodiment in the foregoing description. Other specific forms of embodiment may be considered without departing from the sprit and essential characteristics of the present invention. For example, in the above-described embodiment, the horizontal and vertical resolutions which the printer can process are 120 dpi×72 dpi, and the print data from the print-data forming unit have resolutions of 120 dpi×120 dpi; however, the embodiment is not limited to this example. According to the embodiment, the pitch of the pins of the printer head is $1/72$ inch, and the minimum unit of vertical transfer of the printer head is $1/216$ inch; however, the embodiment is not limited to these. The present invention is applicable to a condition which satisfies the case (1) or (2) above.

The present invention is not limited to two passes in which eight raster lines are printed, according to the embodiment. The eight raster lines may be printed in three passes or more.

Figure 13:
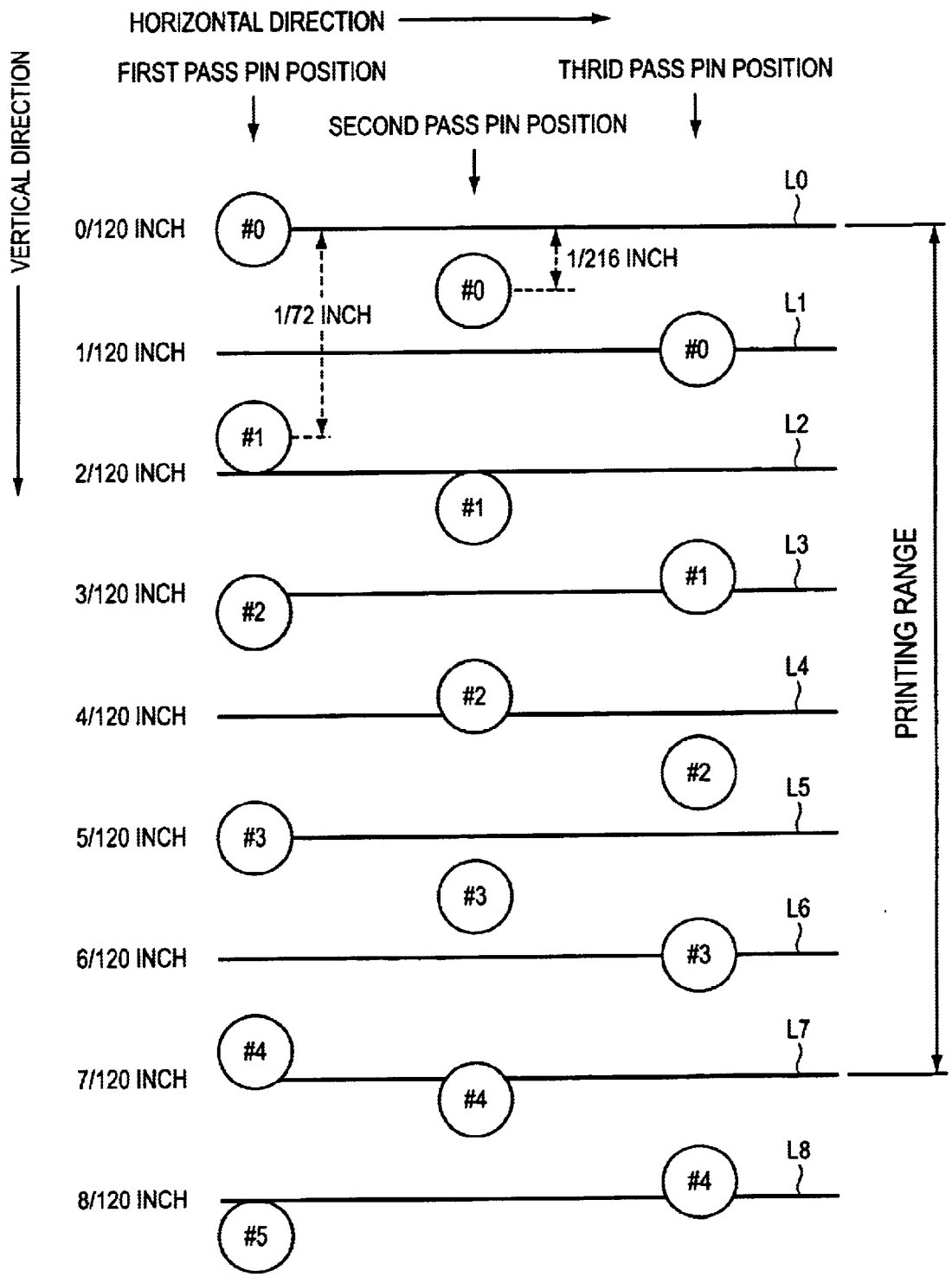
FIG. 13 is a diagram of the relationship between raster lines to be printed and the position of printer head pins when a print-starting line is the raster line L0 as in the diagram shown in FIG. 1, while, in FIG. 13, the number of passes for printing is three.

An example is described below, in which the operation is performed in three passes. In this case, the print-starting raster line is the raster line L0. The relationship between the pins for printing and the raster lines L0, L1, L2, . . . is shown in FIG. 13, and a raster-line/pin-relationship table of the above relationship is shown in FIG. 14. Based on the raster-line/pin-relationship table in FIG. 14, the pins #0 and #3 are actuated for printing the raster lines L0 and L5 in a first pass, the pins #1, #2, and #4 are actuated for printing the raster lines L2, L4, and L7 in a second pass, and the pins #0, #1, and #3 are actuated for printing the raster lines L1, L3, and L6 in a third pass.

Thus, any number of printing passes can be set. As the number of passes increases, the printed lines become closer to the raster lines to be printed. However, it is not necessary to set the number of passes to four or more. It may be sufficient with at most three passes. Considering processing time, two passes are sufficient for practical use, as in the above-described embodiment.

The number of raster lines which the printer can print in an operation is at most eight, according to the embodiment, however, it is not limited to eight.

Processing of a horizontal resolution higher than the horizontal resolution which the printer can print is not descried in the description above. These print data may be provided with simple interpolation along the horizontal direction.

The present invention includes a recording medium, such as a floppy disk, an optical disk, and a hard disk, on which a print-control processing program for processing the present invention, as described above, is stored. The processing program may be obtained from a network.

According to the present invention, as described above, printing is enabled when a unit of vertical transfer of a printing head of a printer is not the reciprocal of an integral vertical resolution of print data, or when a pitch of pins of a printing structure of the printing head of the printer has no particular relationship with the vertical resolution, such as an integral multiple of the vertical resolution or the reciprocal of the integral vertical resolution. According to the invention, a printing operation can be performed by using raster-line/pin-relationship tables prepared in advance, thereby enabling high-speed printing by simple processing. Moreover, high-quality printing is enabled by printing on raster lines extremely close to print data.

With a printer which can process data having a horizontal resolution higher than a vertical resolution, printing is enabled by equalizing the vertical resolution with the higher horizontal resolution, thereby enabling high-quality printing.

What is claimed is:

1. A method for controlling a printer that has a printing head for printing data, the method comprising the steps of:

examining a relationship of a position, in each printing pass, of each of a plurality of pins provided in a vertical direction of the printing head to a plurality of raster lines to be printed in a predetermined printing range, based on a vertical resolution of the print data, when a unit of vertical transfer of the printing head is not a reciprocal of an integral vertical resolution of the print data, and a pitch of the pins of the printing head is not any one of an integral multiple of the vertical resolution and the reciprocal of the integral vertical resolution;

preparing a raster-line/pin-relationship table in which pins to be actuated for printing the raster lines to be printed are determined in each printing pass based on the relationship between the position of the pins and the raster lines;

determining a number of printing passes and a position of a print-starting raster line;

consulting the raster-line/pin-relationship table according to the determination; and printing the predetermined printing range by actuating the pins in each printing pass based on the raster-line/pin-relationship table, the pitch of the pins of the printing head, the amount of the unit of vertical transfer of the printing head, the position of the print-starting raster line, and a number of passes in the horizontal direction required for printing the predetermined printing range.

2. The method for print-control of a printer according to claim 1, a plurality of the raster-line/pin-relationship tables being prepared according to the position of the print-starting raster line.

3. The method for print-control of a printer according to claim 2, the position of the print-starting raster line being determined based on the print data under a condition of the vertical resolution of the print data, the pitch of the pins of the printing head, and the unit of vertical transfer of the printing head.

4. The method for print-control of a printer according to claim 3, any one of the plurality of raster-line/pin-relationship tables being selected according to the position of the print-starting raster line which was determined.

5. The method for print-control of a printer according to claim 4, the pins used in each printing pass being actuated by consulting the selected raster-line/pin-relationship table.

6. A print-controlling device for a printer that has a printing head for printing data, the device comprising:

a raster-line/pin-relationship table describing pins to be actuated in each printing pass for printing raster lines to be printed based on a relationship between a position of the pins and the raster lines when a unit of vertical transfer of the printing head is not a reciprocal of an integral vertical resolution of the print data, and a pitch of the pins of the printing head is not any one of an integral multiple of the vertical resolution and the reciprocal of the integral vertical resolution, the printing performed by examining the relationship of the position, in each printing pass, of each of the plurality of the pins provided in a vertical direction of the printing head to the raster lines to be printed in a predetermined printing range;

a print data forming unit that forms the print data to be printed;

a printer driver that determines the position of a print-starting raster line and the number of printing passes, consults the raster-line/pin-relationship table, and outputs a pin driving signal for each driving pass according to the raster-line/pin-relationship table;

a printing head transferring unit that transfers the printing head to a predetermined position based on the signal from the printer driver; and a data transmitting unit that transmits print data and information required for printing operation received from the printer driver;

the printing range based on the vertical resolution of the print data, the pitch of the pins of the printing head, an amount of a unit of vertical transfer of the printing head, the position of the print-starting raster line, and a number of passes in a horizontal direction required for printing the predetermined printing range.

7. The print-controlling device for a printer according to claim 6, a plurality of the raster-line/pin-relationship tables being prepared based on the variations of the position of the print-starting raster line.

8. The print-controlling device for a printer according to claim 7, the position of the print-starting raster line being determined by the print data, under conditions of the vertical resolution of the print data, the pitch of the pins of the printing head, and the unit of vertical transfer of the printing head.

9. The print-controlling device for a printer according to claim 8, the printer driver selecting one of the plurality of raster-line/pin-relationship tables based on the position of the print-starting raster line which was determined by the printer driver.

10. The print-controlling device for a printer according to claim 9, the pins used in each printing pass being actuated by consulting the selected raster-line/pin-relationship table.

11. A method for controlling a printer that has a printing head for printing data, the method comprising the steps of:

examining a relationship of a position, in each printing pass, of each of a plurality of marking elements provided in a vertical direction of the printing head to a plurality of raster lines to be printed in a predetermined printing range, based on a vertical resolution of the print data, when a unit of vertical transfer of the printing head is not a reciprocal of an integral vertical resolution of the print data, and a pitch of the marking elements of the printing head is not any one of an integral multiple of the vertical resolution and the reciprocal of the integral vertical resolution;

preparing a raster-line/marking element-relationship table in which marking elements to be actuated for printing the raster lines to be printed are determined in each printing pass based on the relationship between the position of the marking elements and the raster lines;

determining a number of printing passes and a position of a print-starting raster line;

consulting the raster-line/marking element-relationship table according to the determination; and printing the predetermined printing range by actuating the marking elements in each printing pass based on the raster-line/marking element-relationship table, the pitch of the marking elements of the printing head, the amount of the unit of vertical transfer of the printing head, the position of the print-starting raster line, and a number of passes in the horizontal direction required for printing the predetermined printing range.

12. A print-controlling device for a printer that has a printing head for printing data, the device comprising:

a raster-line/marking element-relationship table describing marking elements to be actuated in each printing pass for printing raster lines to be printed based on a relationship between a position of the marking elements and the raster lines when a unit of vertical transfer of the printing head is not a reciprocal of an integral vertical resolution of the print data, and a pitch of the marking elements of the printing head is not any one of an integral multiple of the vertical resolution and the reciprocal of the integral vertical resolution, the printing performed by examining the relationship of the position, in each printing pass, of each of the plurality of the marking elements provided in a vertical direction of the printing head to the raster lines to be printed in a predetermined printing range;

a print data forming unit that forms the print data to be printed;

a printer driver that determines the position of a print-starting raster line and the number of printing passes, consults the raster-line/marking element-relationship table, and outputs a marking element driving signal for each driving pass according to the raster-line/marking element-relationship table;

a printing head transferring unit that transfers the printing head to a predetermined position based on the signal from the printer driver; and a data transmitting unit that transmits print data and information required for printing operation received from the printer driver;

the printing range based on the vertical resolution of the print data, the pitch of the marking elements of the printing head, an amount of a unit of vertical transfer of the printing head, the position of the print-starting raster line, and a number of passes in a horizontal direction required for printing the predetermined printing range.

* * * * *